L. F. CALHOUN.
CUTTING TOOL HOLDER.
APPLICATION FILED OCT. 5, 1920.
1,385,519.
Patented July 26, 1921.
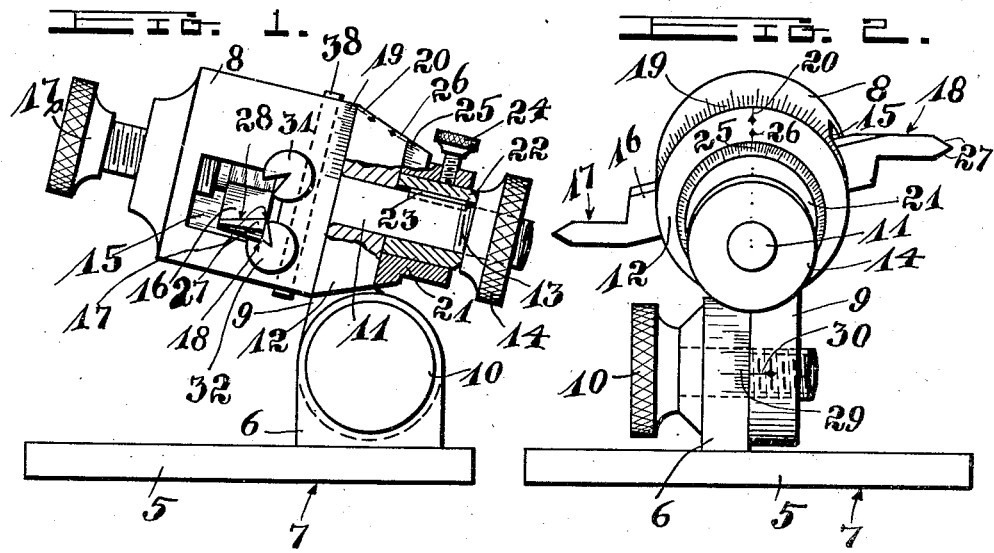
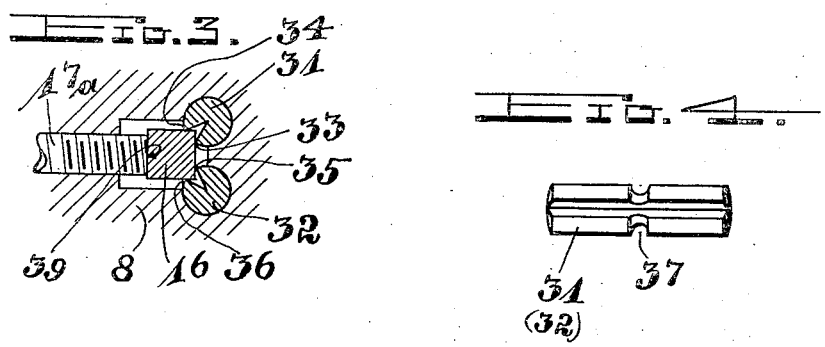
INVENTOR:
LESLIE F. CALHOUN,
BY Otto H. Krueger
his Atty.

UNITED STATES PATENT OFFICE.

LESLIE F. CALHOUN, OF LOS ANGELES, CALIFORNIA.

CUTTING-TOOL HOLDER.

1,385,519.   Specification of Letters Patent.   Patented July 26, 1921.

Application filed October 5, 1920. Serial No. 414,920.

*To all whom it may concern:*

Be it known that I, LESLIE F. CALHOUN, a citizen of the United States, residing at Los Angeles, in the county of Los Angeles and State of California, have invented a new and useful Cutting-Tool Holder, of which the following is a specification.

This invention relates to devices for holding cutting tools while grinding the cutting tool.

One of the objects of this invention is to make it easy to sharpen or regrind a tool so as to insure a correct cutting edge for such tools (as for cutting threads and other similar purposes where the correctness of the finished work depends very much on the sharpening and resharpening of the tool) even by not very experienced operators.

Another object is to provide a device with means by which an inserted cutting tool is automatically centralized and squared, that is disposed at the proper angle within the holder.

Another object is to provide a device in which different sizes of cutting tools can be disposed so as to automatically settle into a proper centralized and adjusted position to insure correct sharpening and resharpening.

Another object is to provide a device with graduations for indicating certain positions of the tools disposed in the device for insuring a correct sharpening and re-sharpening.

Another object is to provide a device with a graduated adjustable member for allowing a setting of the device at odd angles so that a tool can be inserted to be ground off center, the off-set point to be ground evenly on both sides.

Another object is to provide a simple and durable tool which allows a varying of the angle at which an inserted cutting tool may be sharpened and resharpened so that the device may easily be used by any mechanic.

Other objects will appear from the following description and appended claims as well as from the accompanying drawing, in which—

Figure 1 is a side elevation of the device, a small portion being shown in midsectional view to illustrate the setting of the device.

Fig. 2 is an end elevation of the device as projected from the illustration of Fig. 1.

Fig. 3 is a cross sectional view of the centralizing means of the device.

Fig. 4 is a side elevation of one of the centralizing pins.

The base plate 5 is provided with a lug 6. The lower face 7 of the base plate is planed off or properly evened so that the device may be shifted and moved about on the top plate of a grinding machine below the grinding wheel so as to sharpen and resharpen a cutting tool accurately when such a cutting tool is inserted in the device and so moved and operated.

The body member of the device, indicated at 8, is provided with a corresponding lug 9 to engage face to face with the lug 6 of the base plate 5. A set screw 10 is provided for holding the two lugs 6 and 9 properly engaged and in proper positions. The body member 8 is in this manner swingably disposed in relation to the base plate 5. Assuming that the lower face 7 of the base plate is placed and disposed horizontally, then the swinging movement of the body member is in a vertical plane, and the body member 8 can be set at any angle within its swinging ability by the set screw 10. The body member is furthermore provided with a pin 11, preferably to engage turnably within a flange-portion 12, this arrangement being illustrated in Figs. 1 and 2 in the drawing. The lug 9 and the flange member or portion 12 naturally form the swinging member proper while the body member proper is turnable within and in relation to the lug and flange. The pin 11 is threaded and a nut 14 is disposed on the threads 13 for locking the pin 11 and thereby the body proper to the lug 9 and flange portion 12. The body member 8 is furthermore provided with a main aperture 15 to allow the insertion of cutting tools.

Cutting tools referred to in this specification are mainly of the type used for cutting threads and also used for automatic work, such cutting tools being generally also called high speed tools.

A cutting tool 16 can be shifted either way through the aperture 15 and held locked within the aperture by the set screw $17_a$ so as to project out of the side of the body member 8 to a suitable extent to allow a grinding of the protruding end.

In Fig. 2, the cutting tool 16 is projecting out of the body member 8 equally on both sides.

For close work it is very often necessary to grind a cutting tool off-set as illustrated in Figs. 1 and 2. Such grinding, to be correct and practical, requires almost an expert or at least a good mechanic, especially if a thread cutting point is required on the end of the off-set end of the tool.

With this device, an absolute parallel can be obtained to the edge 17, see Fig. 2, by turning the body member 8 over to the opposite side, 180 degrees from the point where the edge 17 was ground or produced, and the edge 18 naturally is produced with the most accuracy. Graduations 19 are provided on the body member to be placed in suitable and desired relations to the mark 20 on the flange member 12.

Off-set tools are very often produced and made at odd angles, and, if so ground in this device, may tend to make it hard again for unskilled operators to properly count 180 degrees for cutting the second edge, in this case designated 18. To overcome or avoid this, an adjustably disposed and arranged dial 21 is turnably provided in relation to the body member 8.

A sleeve 22 is provided to engage from the rear against and with the flange member 12 so that the body member 8 may be clamped and engaged with the flange member 12 as described above, the nut 14 serving to press the sleeve 22 against the rear side of the flange member 12 thereby drawing the pin 11 in the opposite direction through the flange member 12 and through the sleeve 22 so as to engage the rear face of the body member 8 against the front face of the flange member 12. The sleeve 22 is keyed to the pin 11 by the key 23 allowing a longitudinal movement of the sleeve 22 on the pin 11 but locking the sleeve against rotary movement.

A set screw 24 is provided to hold the dial 21 in suitable and desired relation to the body member 8.

Graduations 25 are provided on the dial to be placed in suitable and desired relation to the mark 26 on the flange member 12.

With this arrangement, it is naturally easy to grind a cutting tool at any desired and odd angle, one way or another, eventually the edge 17 of the tool first ground at any angle desired on between the graduations 19 and the mark 20, and then set the dial 21 with its zero in its graduations pointing to the mark 26 and from then on the body member 8 with the dial (being set so by the set screw 24) is rotated and moved to bring the 180-degrees-mark of the graduations 25 to alinement with the mark 26 of the flange member. The two sides or edges 17 and 18 can then easily be ground and obtained absolutely parallel to one another, the neutral position, for instance, would be for obtaining the edge 17 while the 180-degrees-position would be for obtaining the edge 18, or in the opposite manner. From the neutral position, the body member with the dial can also easily be turned to positions indicating desired angles for obtaining the edges 27, as for thread cutting tools, as will easily be understood.

For undercutting such a tool, the device can be set at a suitable and desired angle so that the edge 17 will be undercut as indicated at 28 in Fig. 1. The face 28 naturally is parallel to the bottom face 7 of the device when the device is moved over the table of a grinding machine below and past the grinding wheel so that the grinding wheel has to pass over the end of the tool, as will easily be understood without any further illustration or explanation. To set the body member at desired angles for such undercutting operation the graduations 29 and the mark 30 are provided.

All graduations and marks may of course be reversed, so that, where now the marks appear, the graduations may take the place of the marks, and the marks may take the place of the graduations without any difference in the operation of setting and adjusting.

The inserting and adjusting of cutting tools in relation to the device will be better understood from the illustration in Fig. 3. The pins or rollers 31 and 32 are turnably disposed in the body member 8 projecting to within the aperture 15 practically parallel to the aperture. Each of the pins or rollers is provided with a longitudinal slit or cut-out forming edges 33, 34, 35 and 36. The set screw $17_a$ is provided with a squarely cut-off face 39 so as to rest squarely on the cutting tool 16. Since the rollers are loosely turnable within the body, they naturally easily give to adjust the cutting tool to settle squarely within the aperture 15. The rollers are held within the body member, each of the rollers having an annular groove 37, by a pin 39. The groove 37 is illustrated as being in about the middle of the pin, but it will easily be understood that the groove can be anywhere in the surface of the pin or roller as long as the pin 39 can be provided within the body so as to hold the rollers in place.

Having thus described my invention, I claim:

1. In a cutting tool holder, a base member having a planed-off underside to be placed on the base of a grinding wheel forming the guiding and supporting means of the device, a swinging member engaging with the base member in a practically vertical plane, a body member having means for engaging with the swinging member in a rotary manner practically crosswise to the swinging motion of the swinging member and having an aperture transversely to its turning engaging means, and engaging means disposed in the body member for holding cutting tools within the aperture of the body member.

2. In a cutting tool holder, a base plate having a leveled bottom face and having a lug projecting upwardly, a swinging member consisting of a lug portion for engaging swingably with the lug on the base plate and a flange portion projecting upwardly with the flat faces crosswise to the swinging movement, a body member having means for engaging turnably with the flange member for a turning movement in the same plane as established by the flat faces of the swinging member and having an aperture transversely to its turning movement, and means disposed in the body member for holding a cutting tool in the aperture.

3. In a cutting tool holder, a base member having a planed-off underside to be placed on the base of a grinding wheel forming the guiding and supporting means of the device, a swinging member having means for swingably engaging with the base member, a body member having means for turnably engaging with the swinging member and having an aperture crosswise through the body and transversely to the turning movement, engaging means disposed in the body member for holding a cutting tool shiftably adjustable in the aperture, indicating means between the base plate and the swinging member for indicating the angular relation of the swinging member to the base member, and indicating means between the swinging member and the body member for indicating the angular relation of the body member to the swinging member.

4. In a cutting tool holder having an aperture through which a cutting tool may be disposed, rollers disposed in the holder turnably with their axes parallel to the axis of the aperture having each a longitudinal groove to engage with one of the edges of an inserted cutting tool.

5. In a cutting tool holder, a roller having a longitudinal groove for engaging with one of the edges of an inserted cutting tool and having a circumferential groove crosswise to the longitudinal groove for holding the roller turnably within the holder.

6. In a cutting tool holder, a base plate having a planed-off underside to be placed on the base of a grinding wheel to bring the base plate to project toward the grinding wheel and having a lug, a swinging member consisting of a lug portion for engaging swingably with the lug of the base member and a flange portion projecting upwardly with the flat flange faces crosswise to the swinging movement, a body member having a pin end projecting through the flange portion of the swinging member, a sleeve member shiftably keyed to the pin end of the body member on the opposite side of the flange portion of the swinging member in relation to the body member, said body member and sleeve member facing and seating on the opposite sides of the flange portion of the swinging member, a nut on the end of the pin end of the body member for pressing the sleeve member against the swinging member and thereby engaging the body member to the swinging member, a dial turnably and adjustably disposed on the sleeve member, and means in the body member for holding a cutting tool in the body member.

7. In a cutting tool holder, a base plate having a planed-off underside to be placed on the base of a grinding wheel to bring the base plate to project toward the grinding wheel and having a lug, a swinging member consisting of a lug portion for swingably engaging with the lug of the base plate and of a flange portion projecting upwardly with the flat flange faces crosswise to the swinging movement, a body member having a pin end projecting through the flange portion of the swinging member, a sleeve member shiftably keyed to the pin end of the body member on the opposite side of the flange portion in relation to the body member, a nut on the end of the pin end of the body member for pressing the sleeve member to the swinging member and thereby engaging the body member to the swinging member, a dial turnably and adjustably disposed on the sleeve member, the body member having an aperture crosswise through the practically cylindrical body member transversely to its longitudinal turning axis through which a cutting tool may be disposed, rollers disposed in the body member turnably with their axes parallel to the axis of the aperture having each a longitudinal groove to engage with one of the edges of an inserted cutting tool, and means for pressing an inserted cutting tool toward the rollers within the aperture for firmly and adjustably holding the tool in the body member.

In testimony that I claim the foregoing as my invention I have signed my name in the presence of two subscribing witnesses.

LESLIE F. CALHOUN.

Witnesses:
OTTO H. KRUEGER,
JESSIE A. MANOCK.